US011532969B2

(12) United States Patent
Norton

(10) Patent No.: US 11,532,969 B2
(45) Date of Patent: Dec. 20, 2022

(54) ACTUATORS AND METHODS FOR USE

(71) Applicant: The Boeing Company, Chicago, IL (US)

(72) Inventor: Gary I. Norton, Charleston, SC (US)

(73) Assignee: The Boeing Company, Chicago, IL (US)

( * ) Notice: Subject to any disclaimer, the term of this patent is extended or adjusted under 35 U.S.C. 154(b) by 721 days.

(21) Appl. No.: 16/446,184

(22) Filed: Jun. 19, 2019

(65) Prior Publication Data

US 2020/0403483 A1 Dec. 24, 2020

(51) Int. Cl.
| | |
|---|---|
| *H02K 7/12* | (2006.01) |
| *B64C 3/56* | (2006.01) |
| *H02K 1/12* | (2006.01) |
| *H02K 1/2706* | (2022.01) |

(52) U.S. Cl.
CPC .............. *H02K 7/125* (2013.01); *B64C 3/56* (2013.01); *H02K 1/12* (2013.01); *H02K 1/2706* (2013.01)

(58) Field of Classification Search
CPC ......... B64C 3/56; H02K 1/2706; H02K 24/00
See application file for complete search history.

(56) References Cited

U.S. PATENT DOCUMENTS

| | | | |
|---|---|---|---|
| 3,553,619 A | 1/1971 | Skrobisch | |
| 3,735,303 A | 5/1973 | Harden | |
| 9,783,288 B1 * | 10/2017 | Moore | B64C 27/24 |
| 2012/0292436 A1 * | 11/2012 | Karem | B64C 3/56 |
| | | | 244/49 |
| 2017/0355438 A1 * | 12/2017 | Bishop | B64C 23/072 |
| 2017/0355441 A1 * | 12/2017 | Winkelmann | B64C 3/56 |
| 2018/0091070 A1 * | 3/2018 | Carbone | H02K 1/2706 |
| 2019/0331174 A1 * | 10/2019 | Mastrocola | F16D 27/14 |

FOREIGN PATENT DOCUMENTS

| | | | | |
|---|---|---|---|---|
| CN | 109592008 A | * | 4/2019 | |
| DE | 102006020799 B4 | * | 1/2018 | ........ B60R 25/02153 |

OTHER PUBLICATIONS

Machine Translation of CN-109592008-A ("Li et al.") (Year: 2019).*
Machine Translation of DE 102006020799 B4 (Year: 2018).*

* cited by examiner

*Primary Examiner* — Quyen P Leung
*Assistant Examiner* — Christopher S Leone
(74) *Attorney, Agent, or Firm* — McDonnell Boehnen Hulbert & Berghoff LLP

(57) ABSTRACT

Examples include an actuator that includes a rotor that includes a permanent magnet; a stator that at least partially surrounds the rotor; a plurality of electromagnets coupled to the stator that are configured to apply magnetic force to the permanent magnet to rotate the rotor; a first lock that (i) has a first mechanical bias to engage the rotor and prevent rotation of the rotor when the rotor is in a home position and (ii) is configured to disengage the rotor against the first mechanical bias while receiving a first control signal; and a second lock that (i) has a second mechanical bias to disengage the rotor and (ii) is configured to engage the rotor against the second mechanical bias to prevent rotation of the rotor while receiving a second control signal.

20 Claims, 19 Drawing Sheets

```
┌─────────────────────────────────────────────────────────┐
│  DETECTING POSITION OF SECOND OUTBOARD SECTION OF       │
│   SECOND FOLDABLE AIRCRAFT WING OF AIRCRAFT WITH        │
│ RESPECT TO SECOND INBOARD SECTION OF SECOND FOLDABLE    │
│                    AIRCRAFT WING                        │
└─────────────────────────────────────────────────────────┘
      215─┘                       │
                                  ▼
┌─────────────────────────────────────────────────────────┐
│ USING PLURALITY OF ELECTROMAGNETS TO ROTATE ROTOR       │
│ SUCH THAT CURRENT POSITION OF FIRST OUTBOARD SECTION    │
│ WITH RESPECT TO FIRST INBOARD SECTION IS SUBSTANTIALLY  │
│  EQUAL TO POSITION OF SECOND OUTBOARD SECTION WITH      │
│         RESPECT TO SECOND INBOARD SECTION               │
└─────────────────────────────────────────────────────────┘
      216─┘
                                                  ↖ 250
```

FIG. 19

ACTUATORS AND METHODS FOR USE

FIELD

The present disclosure generally relates to actuators, and more specifically to actuators configured for moving aircraft control surfaces.

BACKGROUND

Some aircraft have foldable wings that provide improved flight performance when extended and a reduced profile for the aircraft when folded. The folded configuration can allow an increased quantity of aircraft to be parked within a hangar space when the aircraft are not in use. Foldable wing systems typically include heavy hydraulic actuators that are configured to move a foldable wing into position as desired. The substantial weight of the hydraulic actuator generally reduces fuel efficiency and causes less robust flight performance. Additionally, upon loss of hydraulic fluid or another hydraulic system failure, the foldable wing will generally revert to a position that is dictated by gravity alone, which can be undesirable. Thus, a need exists for an actuator that has reduced mass and a backup system for controlling the position of the foldable wing.

SUMMARY

One aspect of the disclosure is an actuator comprising: a rotor comprising a permanent magnet; a stator that at least partially surrounds the rotor; a plurality of electromagnets coupled to the stator that are configured to apply magnetic force to the permanent magnet to rotate the rotor; a first lock that (i) has a first mechanical bias to engage the rotor and prevent rotation of the rotor when the rotor is in a home position and (ii) is configured to disengage the rotor against the first mechanical bias while receiving a first control signal; and a second lock that (i) has a second mechanical bias to disengage the rotor and (ii) is configured to engage the rotor against the second mechanical bias to prevent rotation of the rotor while receiving a second control signal.

Another aspect of the disclosure is an aircraft comprising: a foldable wing comprising an inboard section and an outboard section; and an actuator comprising: a rotor comprising a permanent magnet, wherein the rotor is mechanically coupled to the outboard section; a stator that at least partially surrounds the rotor, wherein the stator is mechanically coupled to the inboard section; a plurality of electromagnets coupled to the stator that are configured to apply magnetic force to the permanent magnet to rotate the outboard section; a first lock that (i) has a first mechanical bias to engage the rotor and prevent rotation of the outboard section when the outboard section is in a home position and (ii) is configured to disengage the rotor against the first mechanical bias while receiving a first control signal; and a second lock that (i) has a second mechanical bias to disengage the rotor and (ii) is configured to engage the rotor against the second mechanical bias to prevent rotation of the outboard section while receiving a second control signal.

A further aspect of the disclosure is a method of operating an actuator, the method comprising: sending a first control signal to a first lock, thereby causing the first lock to disengage a rotor and allow rotation of the rotor with respect to a stator that at least partially surrounds the rotor; sending excitation currents to a plurality of electromagnets coupled to the stator to apply magnetic force to a permanent magnet of the rotor, thereby causing the rotor to rotate from a home position to a rotated position; sending a second control signal to a second lock, thereby causing the second lock to engage the rotor and prevent rotation of the rotor from the rotated position; deactivating the second control signal to cause the second lock to disengage the rotor via mechanical bias of the second lock; rotating the rotor from the rotated position to the home position; and deactivating the first control signal to cause the first lock to engage the rotor via mechanical bias of the first lock and prevent rotation of the rotor from the home position.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 19 is a block diagram of a method, according to an example.

DETAILED DESCRIPTION

Figure 1:
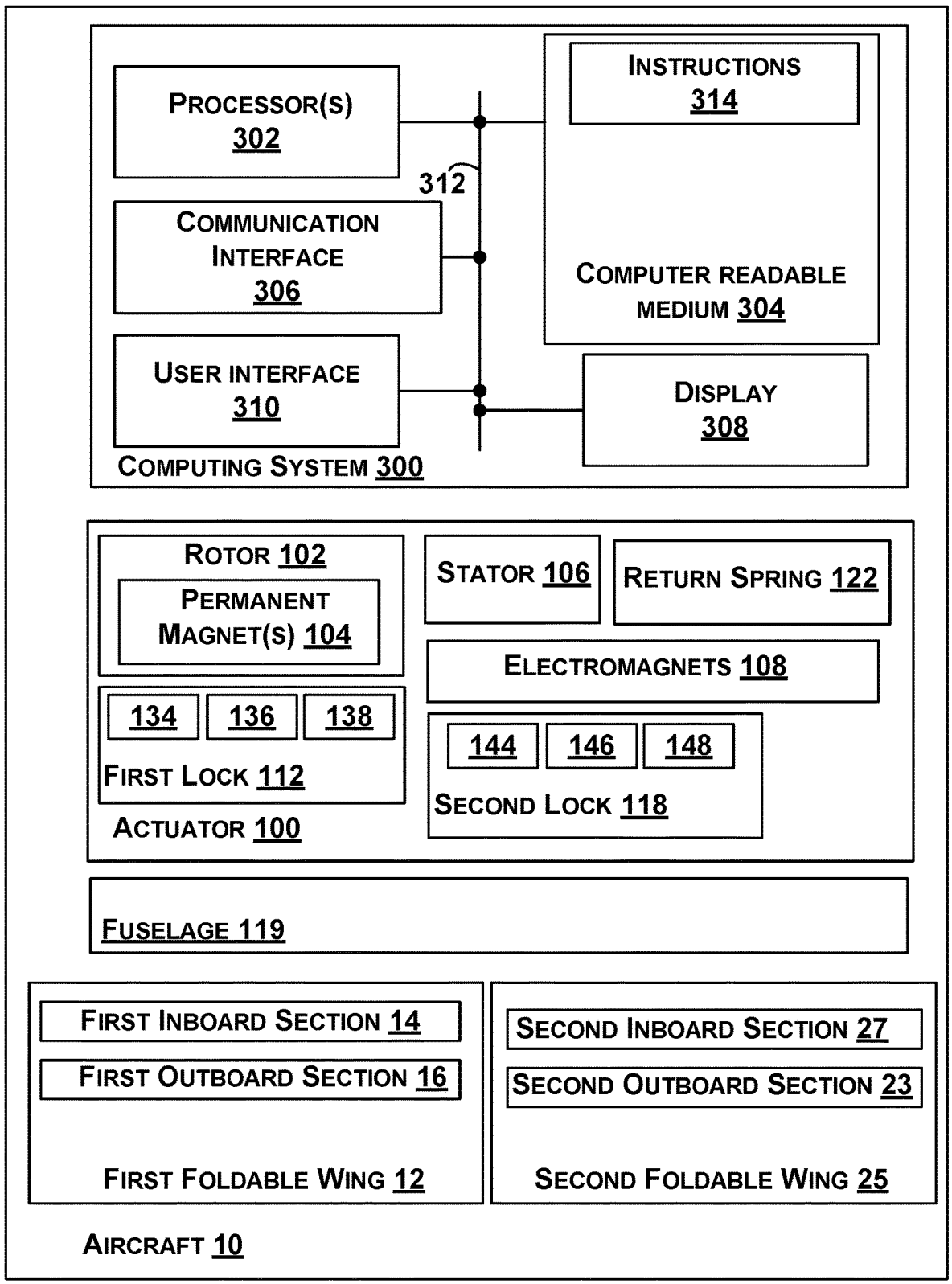
FIG. 1 is a block diagram of an aircraft including a computing system and an actuator, according to an example.

As discussed above, there exists a need for an actuator that has reduced mass and a backup system for controlling the position of a foldable aircraft wing. Accordingly, this disclosure includes such actuators and methods for operating them.

Within examples, an aircraft includes a foldable wing that includes an inboard section and an outboard section. For instance, the inboard section can be coupled to a fuselage of the aircraft and the outboard section (e.g., including a tip of the wing) can be coupled to the inboard section and configured to rotate with respect to the inboard section.

The aircraft further includes an actuator that includes a rotor having one or more permanent magnets. The rotor is mechanically coupled to the outboard section and generally rotates in unison with the outboard section. The actuator also includes a stator that at least partially surrounds the rotor, with the stator being mechanically coupled to the inboard section. The actuator further includes a plurality of electromagnets coupled to the stator that are configured to apply magnetic force to the one or more permanent magnets to rotate the outboard section (e.g., by rotating the rotor). This generally results in rotation of the outboard section with respect to the inboard section.

The actuator also includes a first lock that (i) has a first mechanical bias to engage the rotor and prevent rotation of the outboard section when the outboard section is in a home position and (ii) is configured to disengage the rotor against the first mechanical bias while receiving a first control signal. For example, the first lock can include a spring, a pin, and an electromagnet, and the rotor can include a receptacle that is aligned with the pin when the outboard section (e.g., the rotor) is in the home position. The spring can mechanically bias the pin toward the rotor and, in the absence of the first control signal, move the pin into a receptacle of the rotor when the rotor is in the home position, thereby locking the outboard section and the rotor in the home position. The electromagnet of the first lock can, upon receiving the first control signal, move the pin against the first mechanical bias and away from the rotor to disengage the rotor, thereby allowing rotation of the rotor and the outboard section.

The actuator also includes a second lock that (i) has a second mechanical bias to disengage the rotor and (ii) is configured to engage the rotor against the second mechanical bias to prevent rotation of the outboard section while receiving a second control signal. For example, the second lock can include a spring, a pin, and an electromagnet, and the rotor can include a plurality of receptacles at respective positions on the rotor. The spring of the second lock can mechanically bias the pin away from the rotor in the absence of the second control signal, thereby allowing rotation of the outboard section and the rotor. The electromagnet of the second lock can, upon receiving the second control signal, move the pin against the second mechanical bias and toward the rotor to engage a receptacle of the rotor that is currently aligned with the pin, thereby preventing rotation of the rotor and the outboard section from that position.

In some examples, the actuator includes a return spring (e.g., a torsion spring) that is mechanically biased to rotate the outboard section to the home position. In the event of a power failure, the second lock will generally be disengaged from the rotor and the return spring can move the rotor and the outboard section to the home position. Once the rotor is in the home position, the first lock can engage the rotor due to the first mechanical bias and lock the rotor and the outboard section in the home position (e.g., an extended position).

The actuators and methods disclosed herein can be advantageous because, when compared to conventional actuators and methods, the actuators disclosed herein can have a lower mass and can also provide a backup system for controlling the position of a foldable aircraft wing.

The actuators and methods disclosed herein can also be used for controlling landing gear or control surfaces (e.g., flaps, ailerons, rudders, or horizontal stabilizers). The actuators and methods disclosed herein can also be used for controlling cargo doors or passenger doors on any type of vehicle.

For example, the stator can be coupled to a main body of an aircraft and the rotor can be coupled to landing gear to retract and extend the landing gear. In another example, the rotor can be coupled to a control surface to move the control surface as desired. In yet another example, the rotor can be coupled to a door to open and close the door.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIG. 1 is a schematic block diagram of an aircraft 10. The aircraft 10 includes a first foldable wing 12 having a first inboard section 14 and a first outboard section 16. The aircraft 10 also includes a second foldable wing 25 having a second inboard section 27 and a second outboard section 23. The aircraft 10 also includes a fuselage 119.

The aircraft 10 further includes an actuator 100. The actuator 100 includes a rotor 102 that includes one or more permanent magnets 104. The rotor 102 is mechanically coupled to the first outboard section 16 to rotate in unison with the first outboard section 16.

The actuator 100 further includes a stator 106 that at least partially surrounds the rotor 102. The stator 106 is mechanically coupled to the first inboard section 14.

The actuator 100 also includes a plurality of electromagnets 108 coupled to the stator 106 that are configured to apply magnetic force to the one or more permanent magnets 104 to rotate the rotor 102, thereby rotating the first outboard section 16 relative to the first inboard section 14.

The actuator 100 also includes a first lock 112. The first lock 112 includes a first spring 134, a first pin 136, and a first electromagnet 138. The first lock 112 has a first mechanical bias to engage the rotor 102 and prevent rotation of the rotor 102 and the first outboard section 16 when the first outboard section 16 and the rotor 102 are in a home position. The first lock 112 is configured to disengage the rotor 102 against the first mechanical bias while receiving a first control signal.

The actuator 100 also includes a second lock 118. The second lock 118 includes a second spring 144, a second pin 146, and a second electromagnet 148. The second lock 118 has a second mechanical bias to disengage the rotor 102 and is configured to engage the rotor 102 against the second mechanical bias to prevent rotation of the rotor 102 and the first outboard section 16 while receiving a second control signal.

The actuator 100 also includes a return spring 122 (e.g., a torsion spring) that is mechanically biased to rotate the first outboard section 16 and the rotor 102 to the home position.

The aircraft 10 also includes a computing system 300. In some examples, components of the computing system 300 are distributed across multiple computing systems. However, for the sake of example, the components are shown and described as part of the computing system 300. The computing system 300 can be or include a mobile device (such as a mobile phone), a desktop computer, a laptop computer, a tablet computer, a server, a network of multiple servers, or one or more similar devices that can be configured to perform the functions described herein.

As shown in FIG. 1, the computing system 300 includes one or more processors 302, a non-transitory computer readable medium 304, a communication interface 306, a display 308, and a user interface 310. Components of the computing system 300 illustrated in FIG. 1 are linked together by a system bus, network, or other connection mechanism 312.

The one or more processors 302 can be any type of processor(s), such as a microprocessor, a digital signal processor, a multicore processor, etc., coupled to the non-transitory computer readable medium 304.

The non-transitory computer readable medium 304 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 304 can be configured to store instructions 314. The instructions 314 are executable by the one or more processors 302 to cause the computing system 300 to perform any of the functions of the computing system 300 described herein.

The communication interface 306 can include hardware to enable communication within the computing system 300 and/or between the computing system 300 and one or more other devices. The hardware can include transmitters, receivers, and antennas, for example. The communication interface 306 can be configured to facilitate communication with one or more other devices, in accordance with one or more wired or wireless communication protocols. For example, the communication interface 306 can be configured to facilitate wireless data communication for the computing system 300 according to one or more wireless communication standards, such as one or more Institute of Electrical and Electronics Engineers (IEEE) 801.11 standards, ZigBee standards, Bluetooth standards, etc. As another example, the communication interface 306 can be configured to facilitate wired data communication with one or more other devices.

The display 308 can be any type of display component configured to display data. As one example, the display 308 can include a touchscreen display. As another example, the display 308 can include a flat-panel display, such as a liquid-crystal display (LCD) or a light-emitting diode (LED) display.

The user interface 310 can include one or more pieces of hardware used to provide data and control signals to the computing system 300. For instance, the user interface 310 can include a mouse or a pointing device, a keyboard or a keypad, a microphone, a touchpad, or a touchscreen, among other possible types of user input devices. Generally, the user interface 310 can enable an operator to interact with a graphical user interface (GUI) provided by the computing system 300 (e.g., displayed by the display 308).

Figure 17:
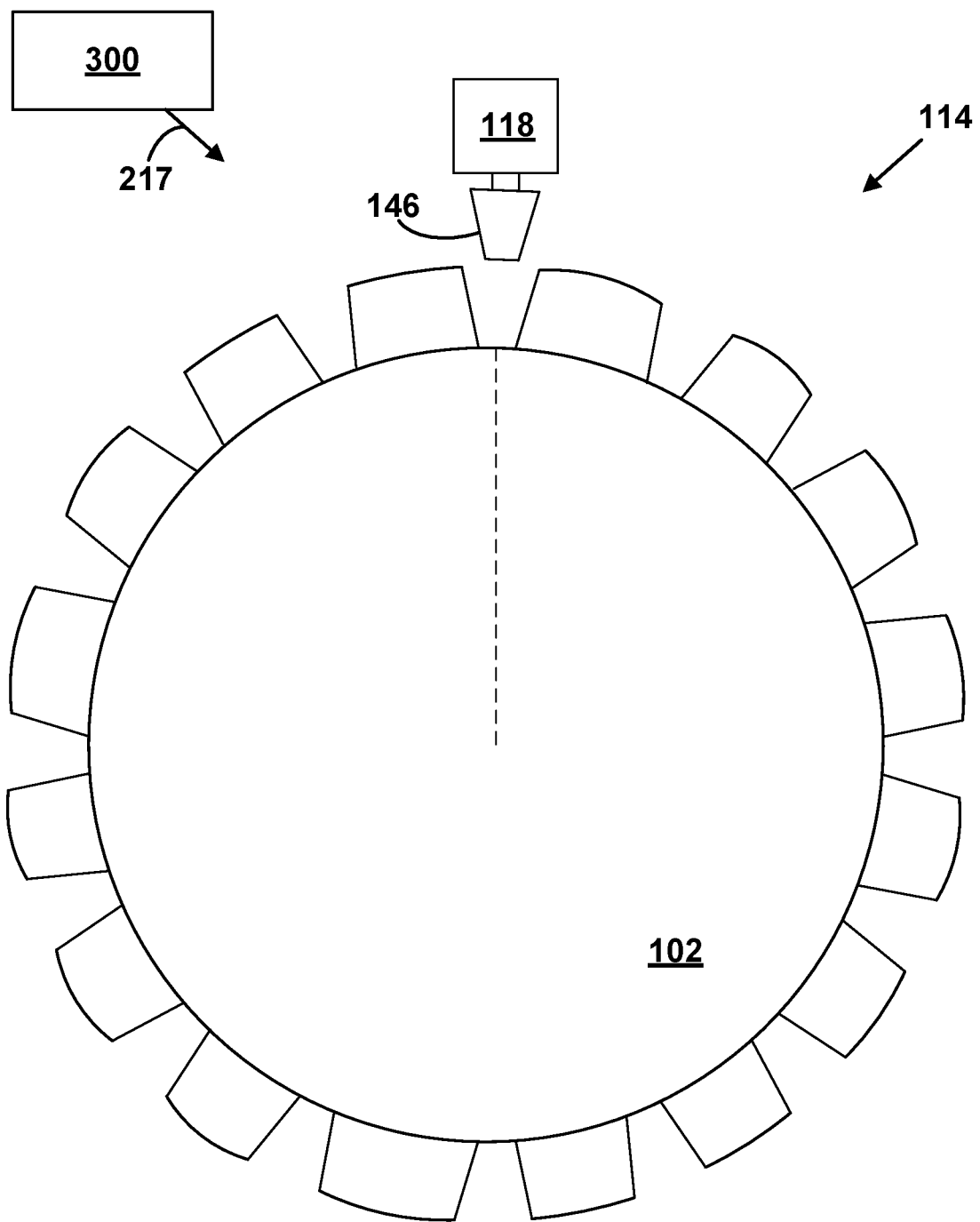
FIG. 17 is a schematic cross sectional diagram of a rotor and a lock, according to an example.
Figure 18:
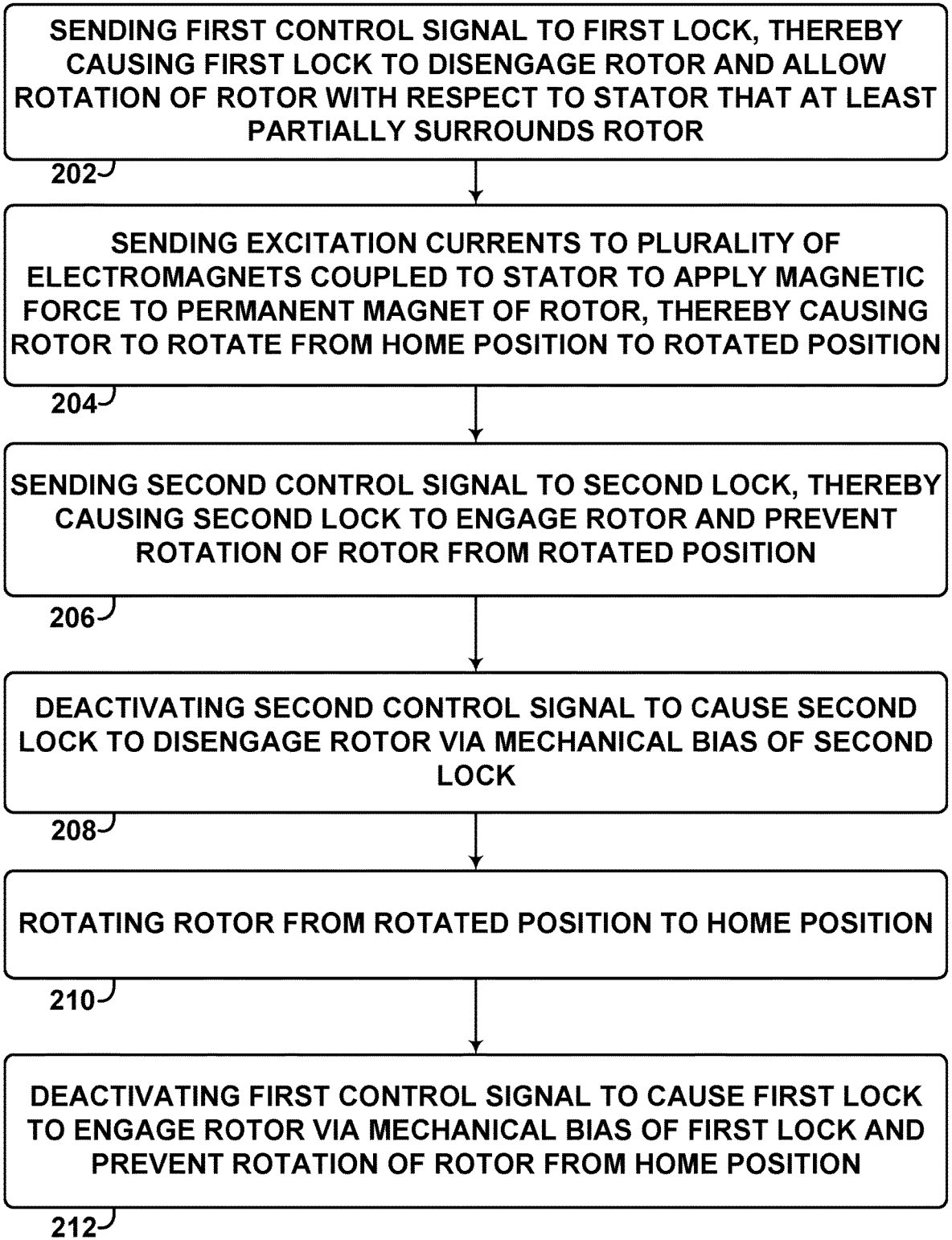
FIG. 18 is a block diagram of a method, according to an example.

FIGS. 2-17 further depict the aircraft 10 and functionality related to the computing system 300, the actuator 100, the method 200 shown in FIG. 18, and the method 250 shown in FIG. 19.

Figure 2:
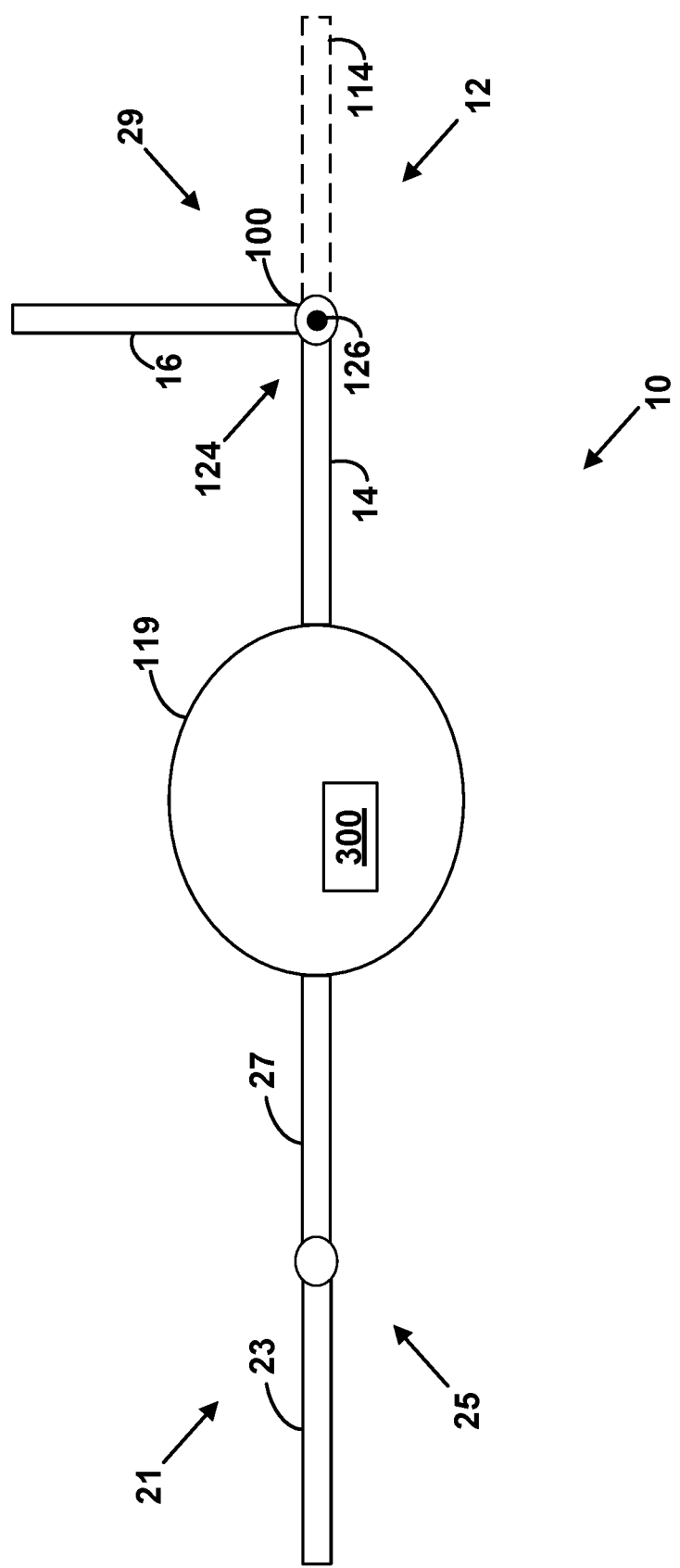
FIG. 2 is a schematic diagram of an aircraft and functionality performed by a computing system and an actuator, according to an example.

FIG. 2 is an aft-looking schematic cross sectional diagram of the aircraft 10 having the first foldable wing 12 and the second foldable wing 25. The first inboard section 14 is coupled to the fuselage 119 and the first outboard section 16 is coupled to the first inboard section 14 via the actuator 100. The second inboard section 27 is coupled to the fuselage 119 and the second outboard section 23 is coupled to the second inboard section 27 via another actuator 100.

The actuator 100 is configured to rotate the first outboard section 16 with respect to the first inboard section 14. The computing system 300 generally controls the actuator 100 by sending control signals or excitation currents to the actuator 100. FIG. 2 shows the first outboard section 16 in an upright position (e.g., perpendicular to and above the first inboard section 14). FIG. 2 also denotes the home position 114 of the rotor and the first outboard section 16 (e.g., parallel with the first inboard section 14). In some examples, the actuator 100 is configured to rotate the first outboard section 16 over smaller or larger ranges of motion (e.g., 0-360°).

The return spring of the actuator 100 is mechanically biased to rotate the first outboard section 16 to the home position 114, but the mechanical bias of the return spring can be overcome via other control operations discussed below.

The rotor and stator of the actuator 100 form a hinge 124 having an axis of rotation 126. That is, the rotor is positioned generally within the stator. The hinge 124 mechanically couples the first inboard section 14 to the first outboard section 16 and allows rotation about the axis of rotation 126 of the first outboard section 16 relative to the first inboard section 14.

In some embodiments, the computing system 300 controls the first outboard section 16 such that a current position 29 of the first outboard section 16 matches the position 21 of the second outboard section 23. For example, the computing system 300 can use a hall sensor or another positional sensor to detect the position 21 of the second outboard section 23 with respect to the second inboard section 27. Next, the computing system 300 can control the plurality of electromagnets of the actuator 100 to rotate the rotor such that the current position 29 of the first outboard section 16 with respect to the first inboard section 14 is substantially equal to the position 21 of the second outboard section 23 with respect to the second inboard section 27.

Figure 3:
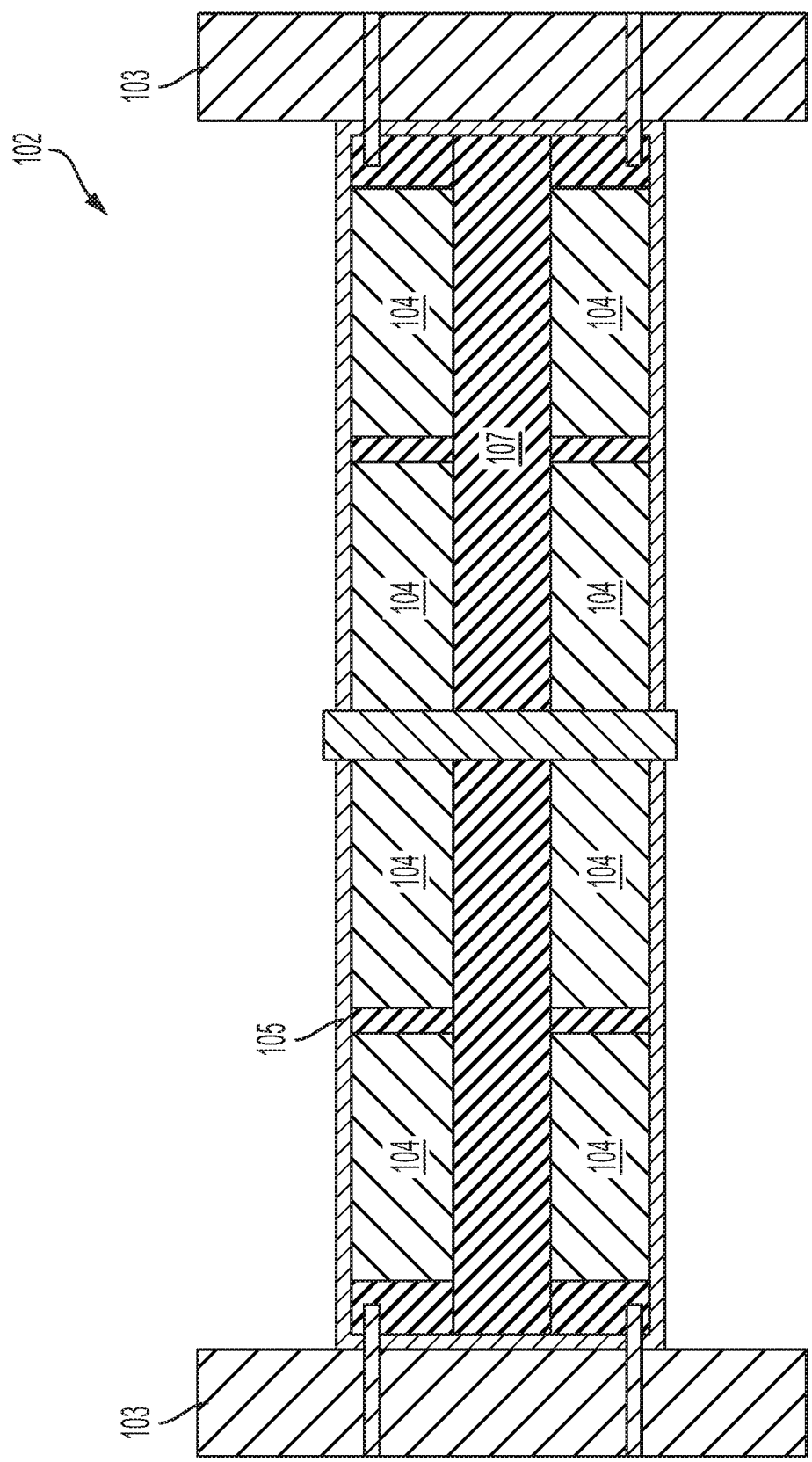
FIG. 3 is a schematic cross sectional diagram of a rotor of an actuator, according to an example.

FIG. 3 is an outboard-looking schematic cross sectional diagram of the rotor 102. The rotor 102 has a dumbbell shape and includes end plates 103 that bookend a shaft 105. The end plates 103 and the shaft 105 have substantially cylindrical shapes. The end plates 103 and the shaft 105 can be constructed of metal or carbon fiber, but other materials are possible. The end plates 103 are attached to the shaft 105 such that the end plates 103 and the shaft 105 generally rotate and/or move in unison. The end plates 103 can be positioned respectively at or near the leading edge and the trailing edge of the foldable wing. In embodiments in which multiple rotors 102 are attached end-to-end (e.g., via end plates 103), there will be end plates at various locations (e.g., forward and aft) within a foldable wing. The rotor 102 includes the one or more permanent magnets 104 dispersed around an inner wall of the shaft 105. The shaft 105 includes a core 107 (e.g., steel, carbon fiber, etc.) that provides structural support between the one or more permanent magnets 104. The end plates 103 include receptacles that are not shown in FIG. 3, but are discussed below.

Figure 4:
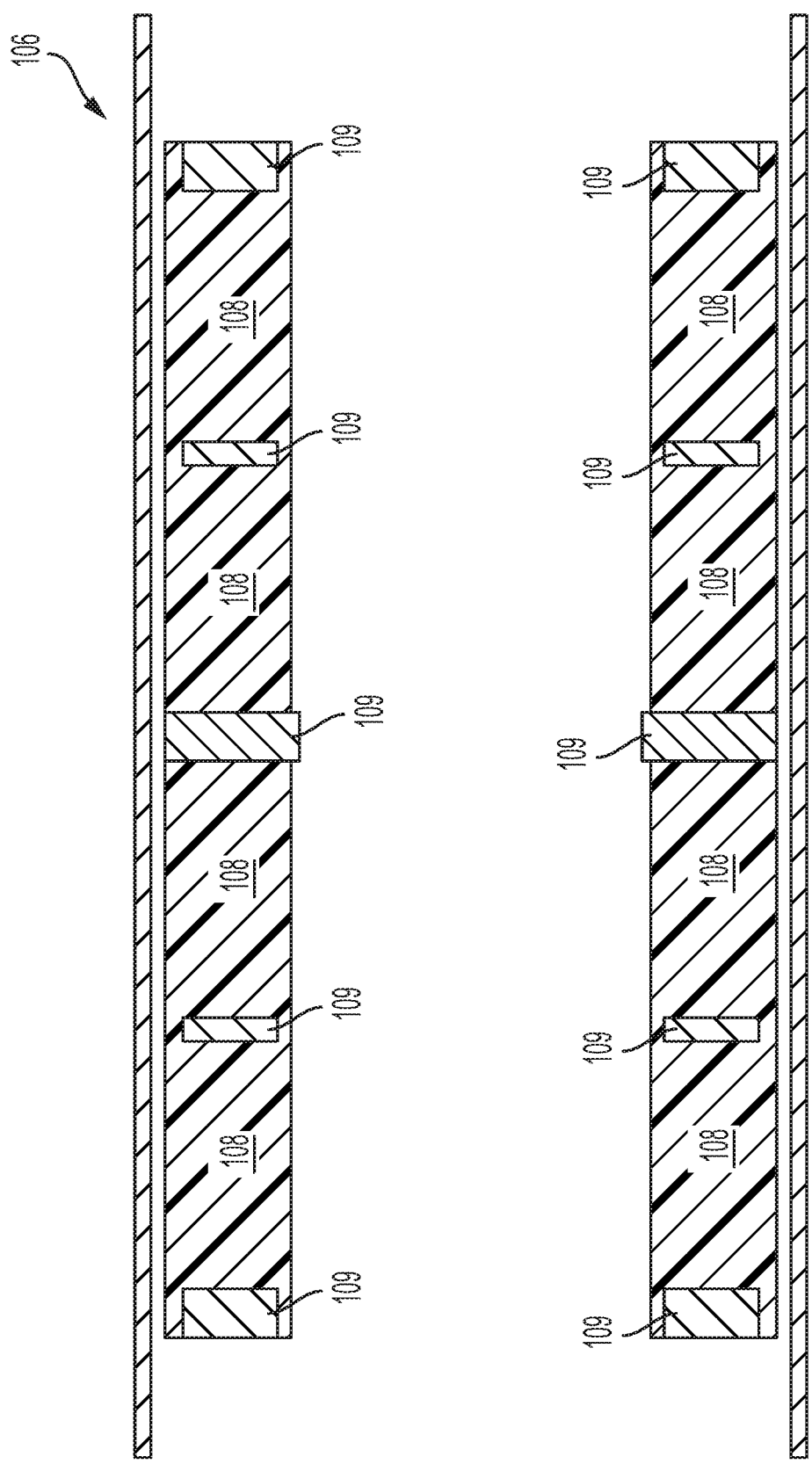
FIG. 4 is a schematic cross sectional diagram of a stator of an actuator, according to an example.

FIG. 4 is an outboard-looking schematic cross sectional diagram of the stator 106 having a sleeve-like and/or cylindrical shape that is configured to at least partially surround the rotor (not shown). The plurality of electromagnets 108 are dispersed around an inner wall of the stator 106. The stator 106 includes a core 109 that provides structural support between the plurality of electromagnets 108.

Figure 5:
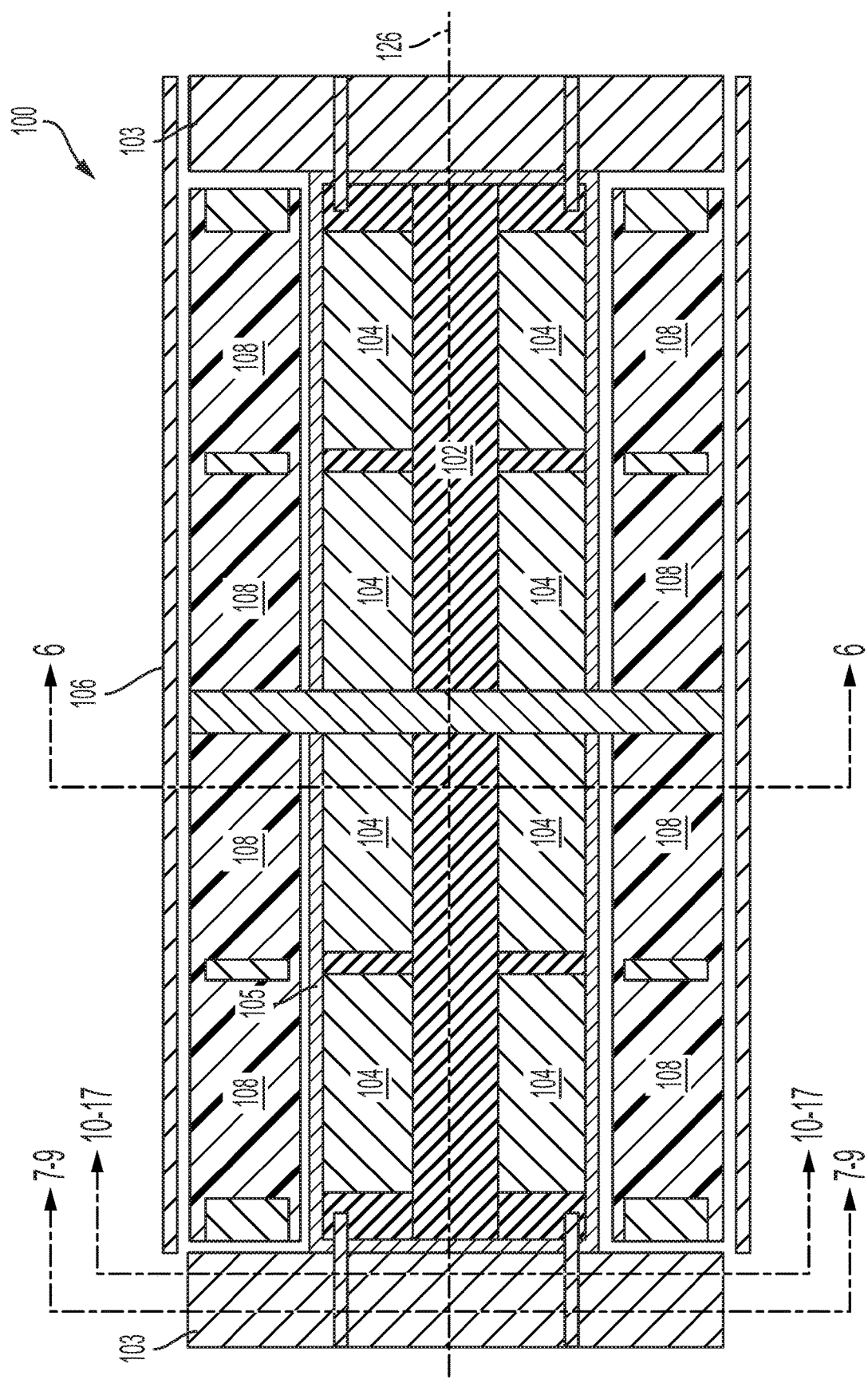
FIG. 5 is a schematic cross sectional diagram of an actuator, according to an example.

FIG. 5 is an outboard looking schematic cross sectional diagram of the rotor 102 assembled within the stator 106. The rotor 102 is configured to rotate about the axis of rotation 126 within the stator 106. Rotation of the rotor 102 also generally causes a corresponding rotation of the first outboard section of the first foldable wing.

Figure 6:
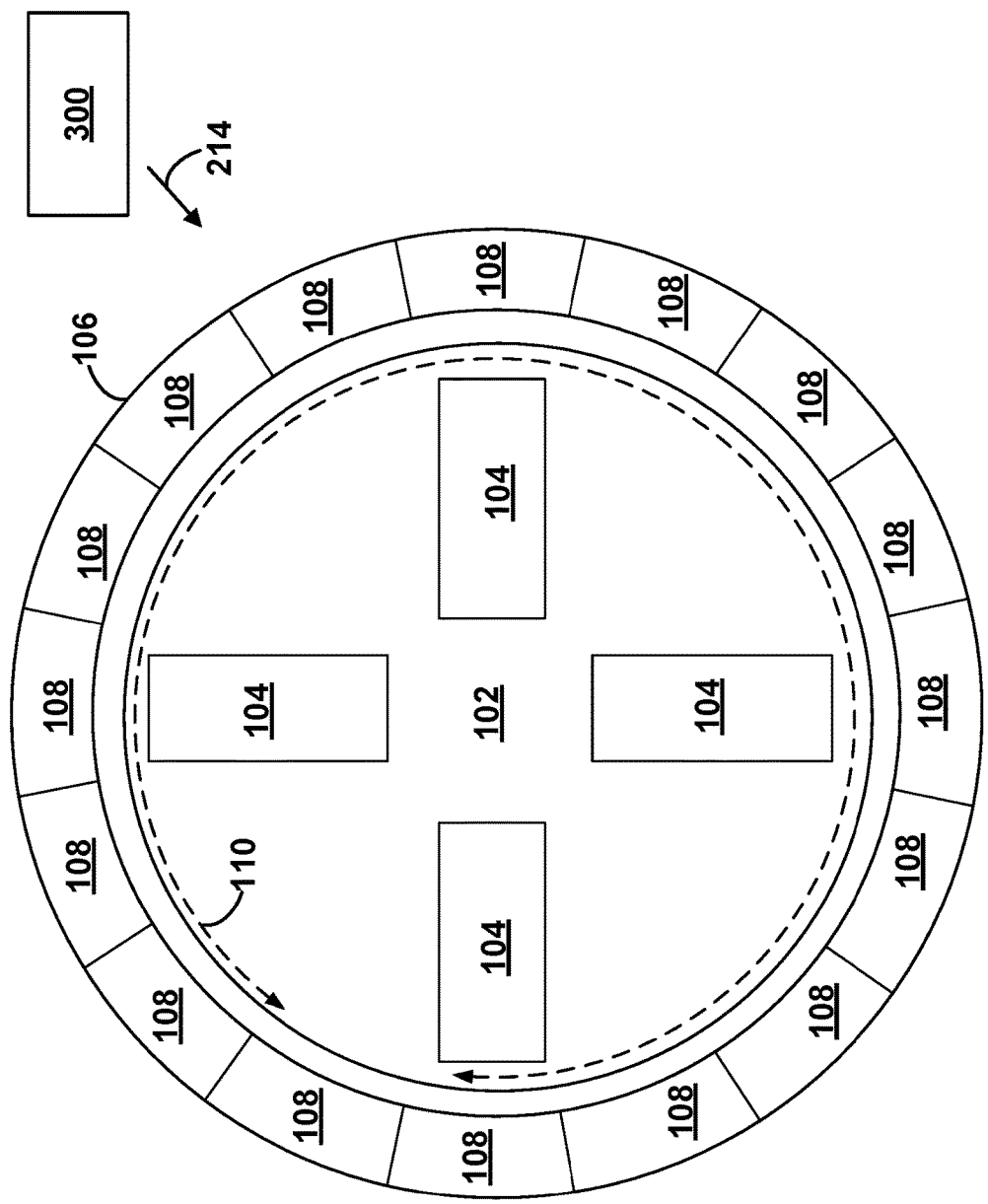
FIG. 6 is a schematic cross sectional diagram of an actuator, according to an example.

FIG. 6 is an aft-looking schematic cross sectional diagram of the rotor 102 and the stator 106. The plurality of electromagnets 108 are configured to apply the magnetic force 110 to the one or more permanent magnets 104 to rotate the rotor 102, thereby rotating the first outboard section of the first foldable wing. Generally, the magnetic forces applied by the plurality of electromagnets 108 to the one or more permanent magnets 104 will not be solely in the azimuthal direction. However, the rotor 102 is configured to only have one degree of freedom, namely azimuthal rotation. Thus, the magnetic force 110 is shown as solely in the azimuthal direction. The plurality of electromagnets 108 can be independently and/or sequentially activated to apply magnetic forces that cause the desired degree of rotation of the rotor 102 and/or the first outboard section of the first foldable wing. The computing system 300 generally sends excitation currents 214 to the plurality of electromagnets 108 to cause the desired rotation of the rotor 102.

Figure 7:
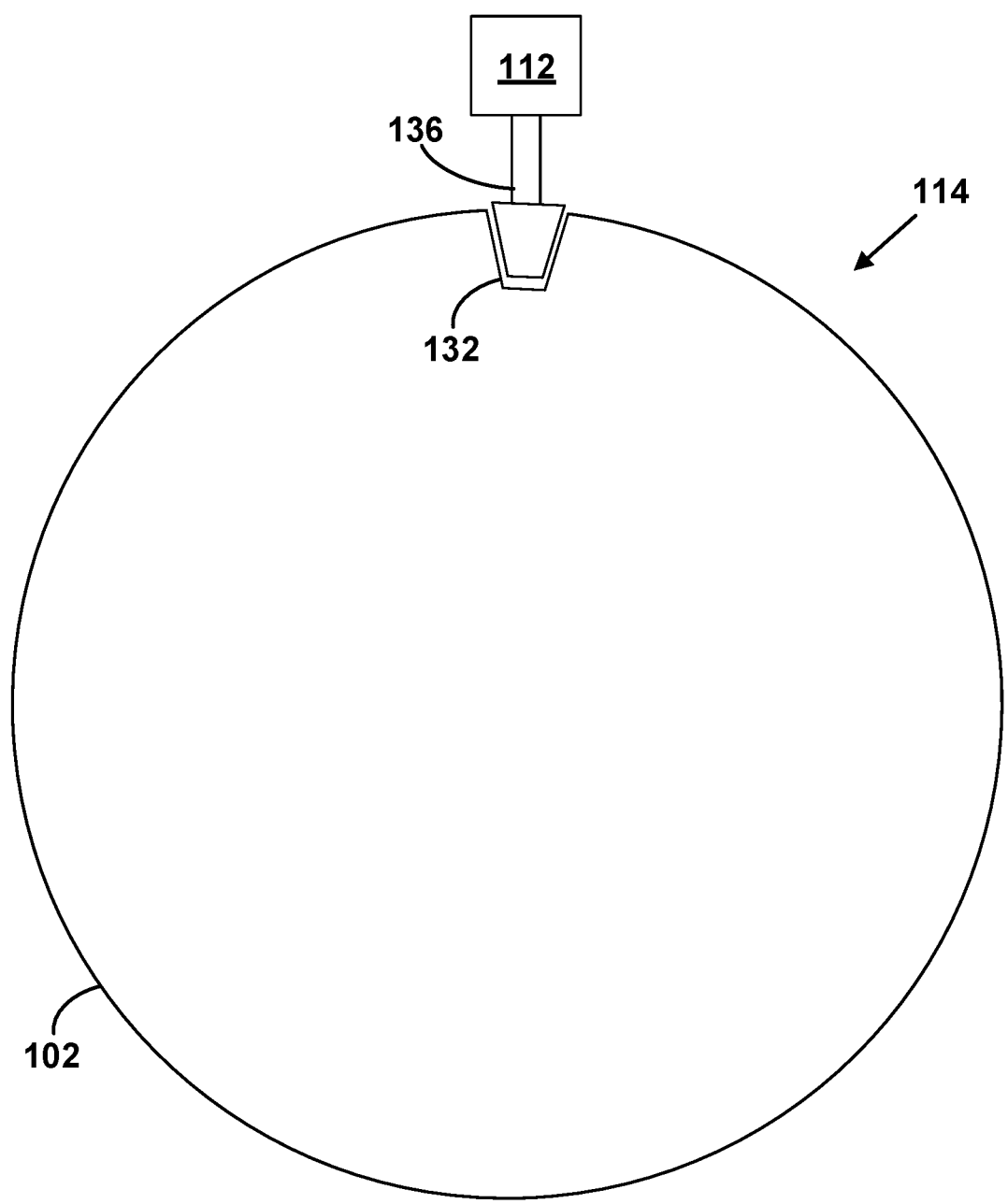
FIG. 7 is a schematic cross sectional diagram of a rotor and a lock, according to an example.
Figure 8:
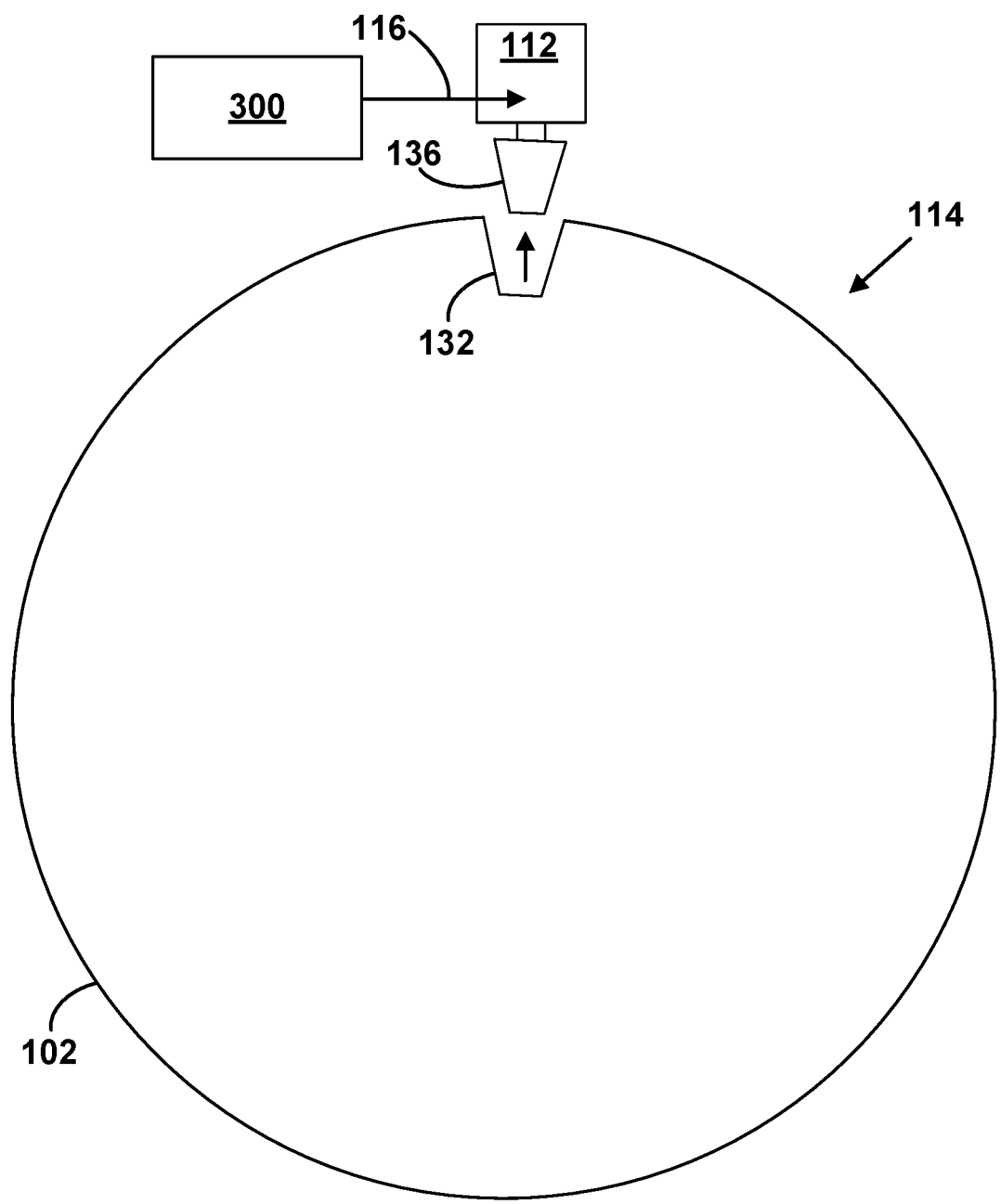
FIG. 8 is a schematic cross sectional diagram of a rotor and a lock, according to an example.
Figure 9:
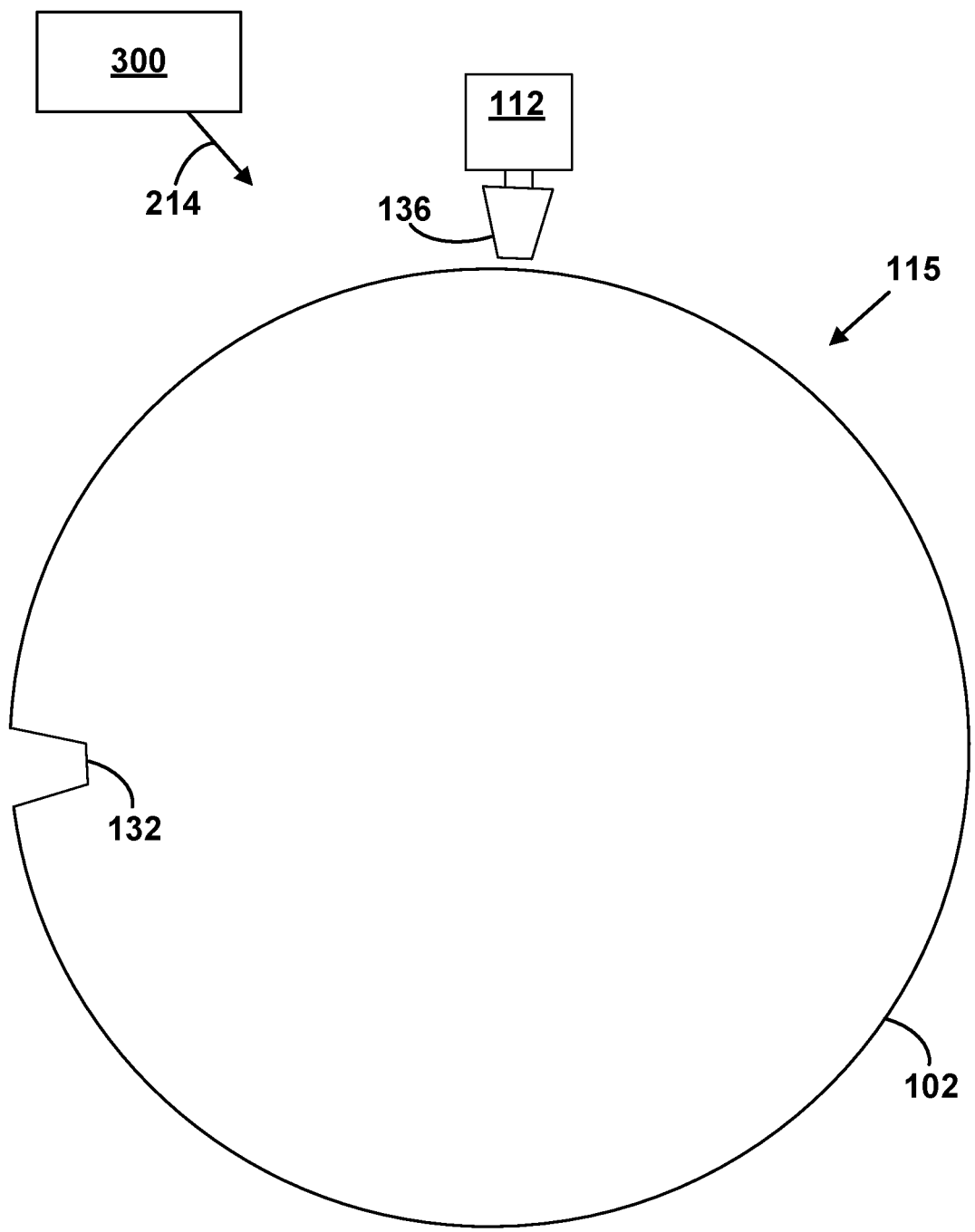
FIG. 9 is a schematic cross sectional diagram of a rotor and a lock, according to an example.

FIGS. 7-9 are aft-looking cross section views of an end plate (e.g., a forward end plate) of the rotor 102. FIGS. 7-9 depict motion of the rotor 102 from a home position to a first rotated position.

As shown in FIG. 7, the end plate has a receptacle 132 configured to receive the first pin 136. In this example, the rotor 102 and the first outboard section (not shown) are in the home position 114 when the receptacle 132 is (e.g., azimuthally) aligned with the first pin 136. The first spring (not shown) of the first lock 112 is biased to push the first pin 136 into the receptacle 132 when the receptacle 132 is aligned with the first pin 136.

FIG. 8 depicts the first lock 112 receiving the first control signal 116 from the computing system 300. While the first electromagnet (not shown) of the first lock 112 is receiving the first control signal 116, the first electromagnet removes the first pin 136 from the receptacle 132, against the force applied by the first spring.

As shown in FIG. 9, after the first lock 112 disengages the rotor 102, the computing system 300 can send excitation currents 214 to the plurality of electromagnets coupled to the stator to apply magnetic force to the one or more permanent magnets of the rotor 102 (see FIG. 6). For example, suitable excitation of the plurality of electromagnets can cause the rotor 102 to rotate 90 degrees counterclockwise from the home position 114 to a first rotated position 115. The first rotated position 115 of the rotor 102 could correspond to the upright position of the first outboard section shown in FIG. 2. The first pin 136 will generally be disengaged from the rotor 102 unless the receptacle 132 is aligned with the first pin 136 and the first lock 112 is not receiving the first control signal 116.

Figure 10:
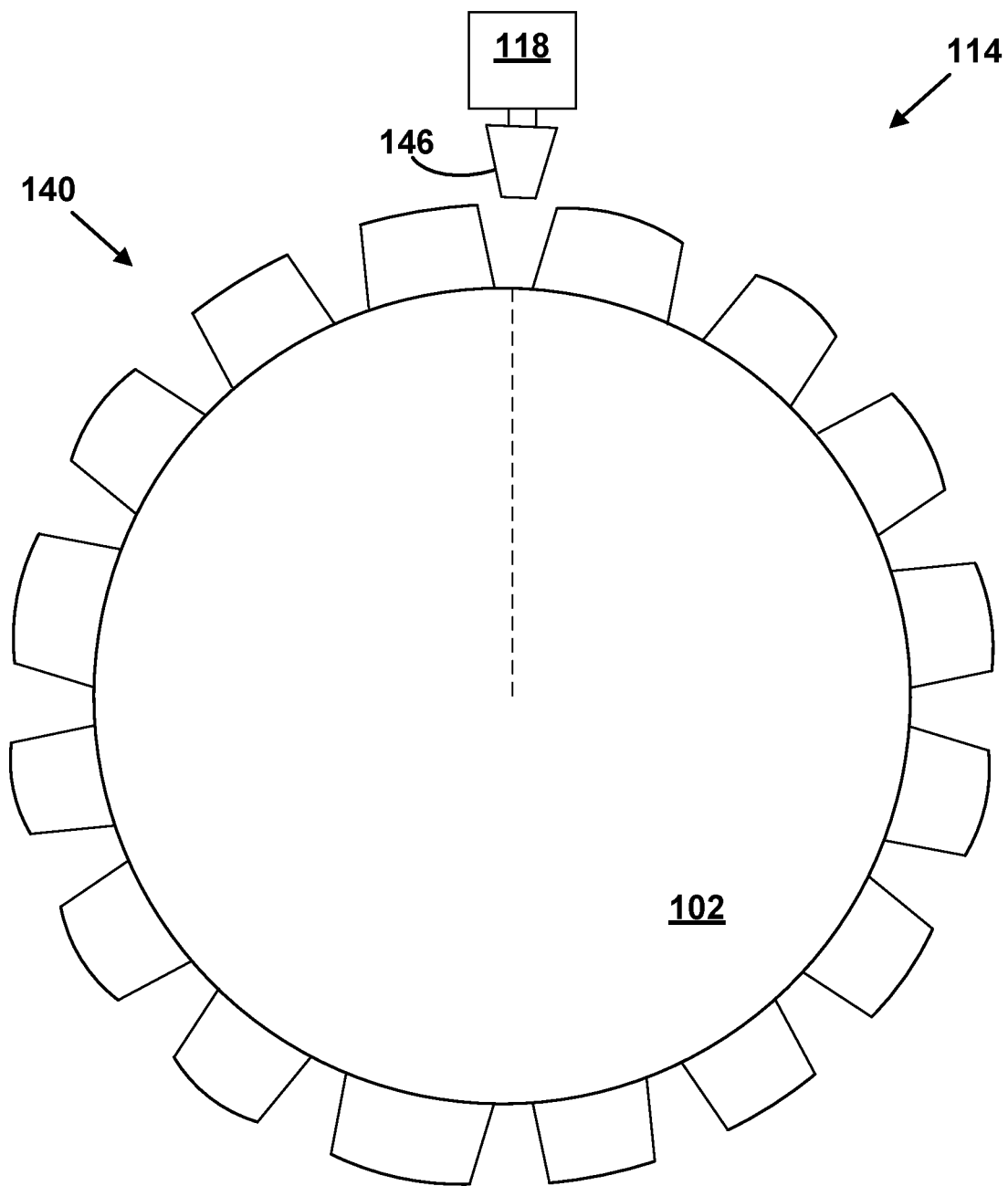
FIG. 10 is a schematic cross sectional diagram of a rotor and a lock, according to an example.
Figure 11:
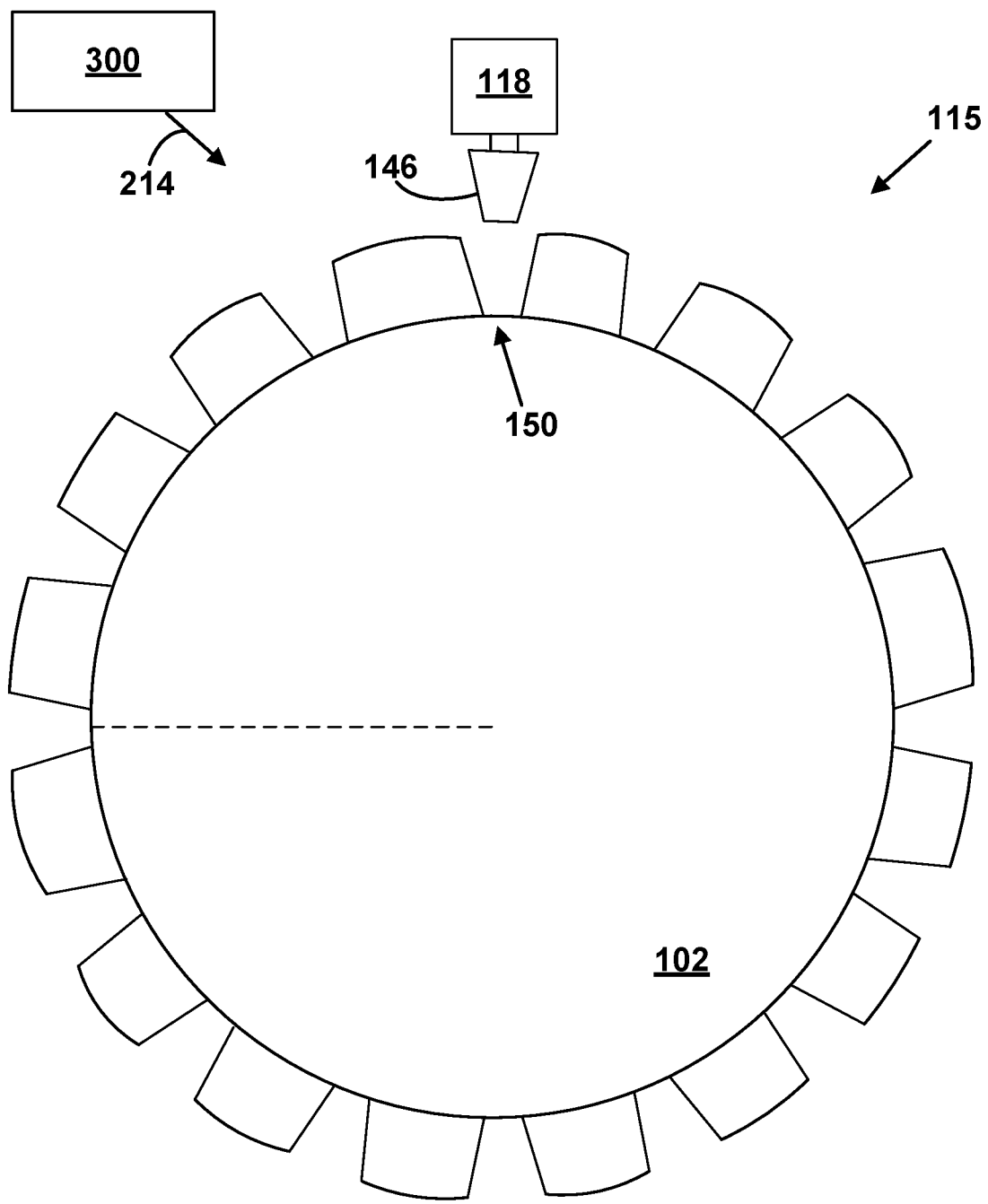
FIG. 11 is a schematic cross sectional diagram of a rotor and a lock, according to an example.
Figure 12:
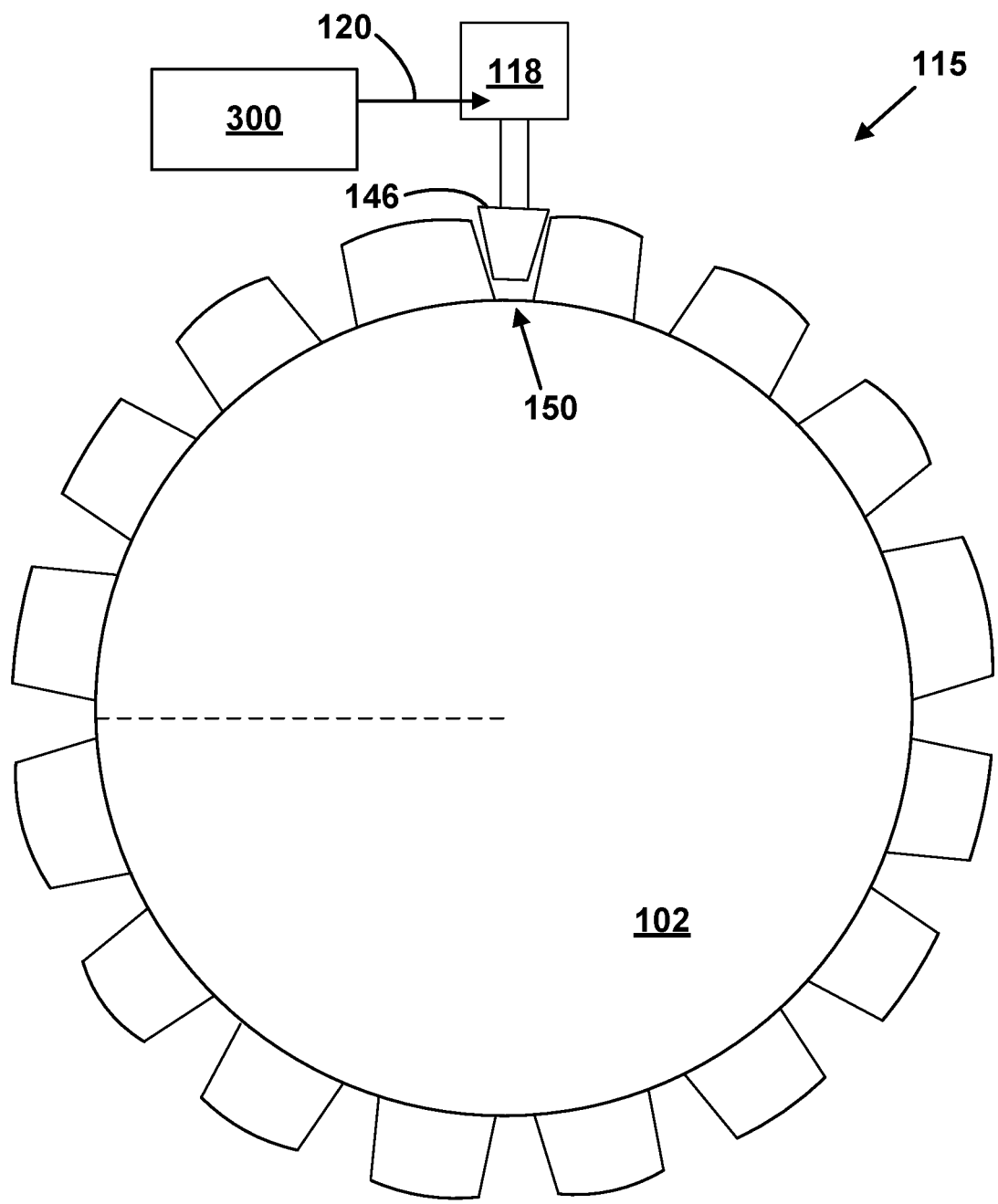
FIG. 12 is a schematic cross sectional diagram of a rotor and a lock, according to an example.

FIGS. 10-12 are also aft-looking schematic cross section views of the end plate of the rotor 102 depicting the same rotation of the rotor 102 from the perspective of the second lock 118.

FIG. 10 corresponds to FIG. 7 in that both figures show the rotor 102 in the home position 114. However, instead of showing the first lock 112, FIG. 10 shows the second lock 118, which is at a different axial position on the rotor 102. In FIG. 10, the second electromagnet (not shown) of the second lock is not receiving the second control signal, thus the second pin 146 is not engaging with any of the plurality of receptacles 140. This is because the second spring of the second lock 118 pushes the second pin 146 away from the plurality of receptacles 140.

FIG. 11 corresponds to FIG. 9 in that both figures show the rotor 102 in the first rotated position 115 (e.g., 90 degrees counterclockwise from the home position 114). In FIG. 11, the receptacle 150 of the rotor 102 is aligned with the second pin 146. As shown, the computing system 300 sends the excitation currents 214 to the rotor 102 to rotate the rotor from the home position 114 to the rotated position 115.

In FIG. 12, the computing system 300 is sending the second control signal 120 to the second lock 118 (e.g., the second electromagnet). As a result, the second electromagnet moves the second pin 146 into the receptacle 150, locking the rotor 102 in the first rotated position 115.

FIGS. 13-17 are aft looking schematic cross section views of the end plate of the rotor 102 that depict rotation of the rotor 102 from the first rotated position 115, to the second rotated position 31, to the home position 114.

Figure 13:
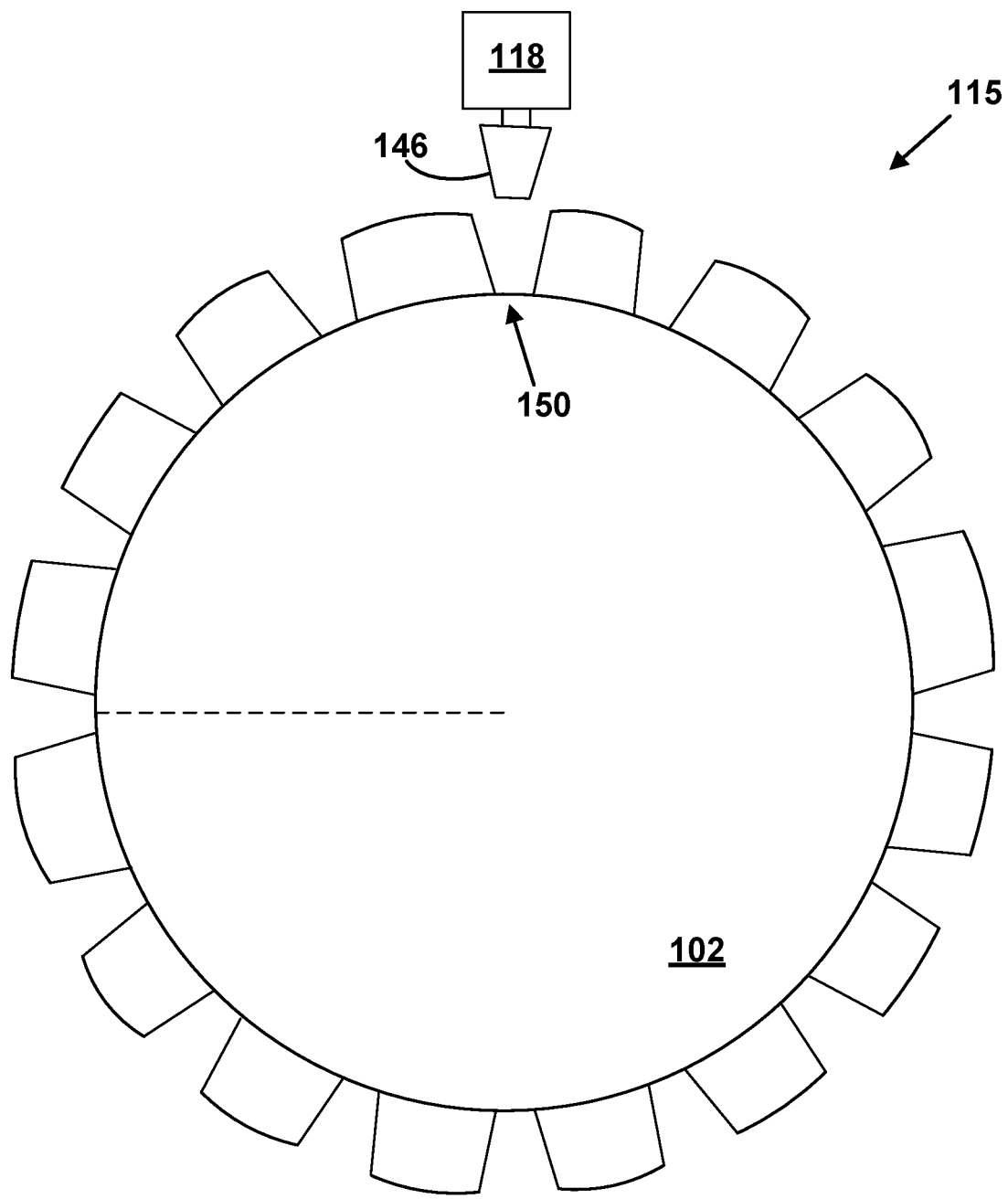
FIG. 13 is a schematic cross sectional diagram of a rotor and a lock, according to an example.

In FIG. 13, the second lock 118 is no longer receiving the second control signal. Thus, the second spring of the second lock 118 removes the second pin 146 from the receptacle 150.

Figure 14:
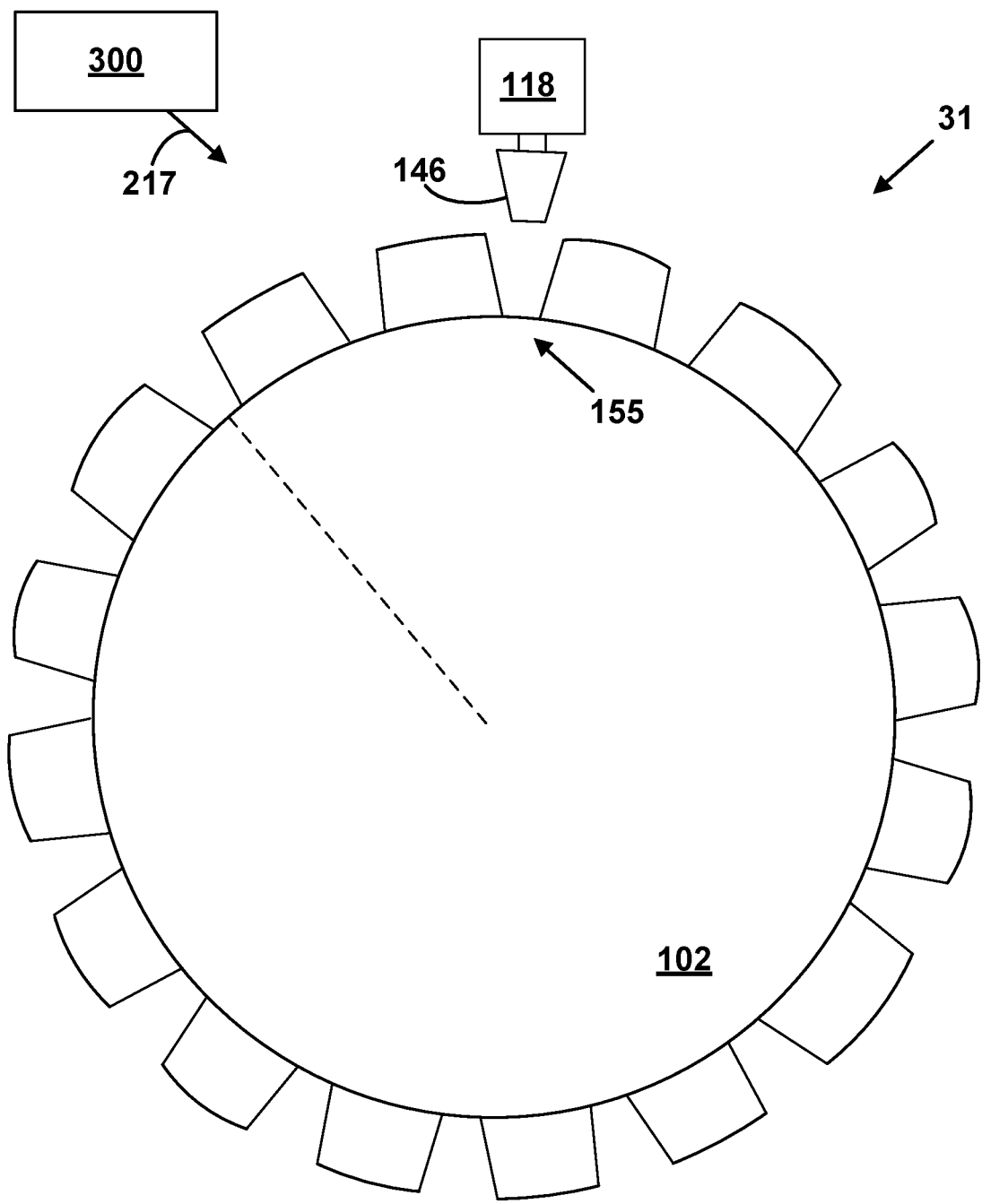
FIG. 14 is a schematic cross sectional diagram of a rotor and a lock, according to an example.

FIG. 14 shows the rotor 102 after the computing system 300 has rotated the rotor 102 from the first rotated position 115 to the second rotated position 31 by sending additional excitation currents 217 to the rotor 102. In FIG. 14, a receptacle 155 is aligned with the second pin 146. In some embodiments, the rotor 102 can move from the first rotated position to the second rotated position 31 or the home position 114 via energy stored by the return spring (see FIG. 1).

Figure 15:
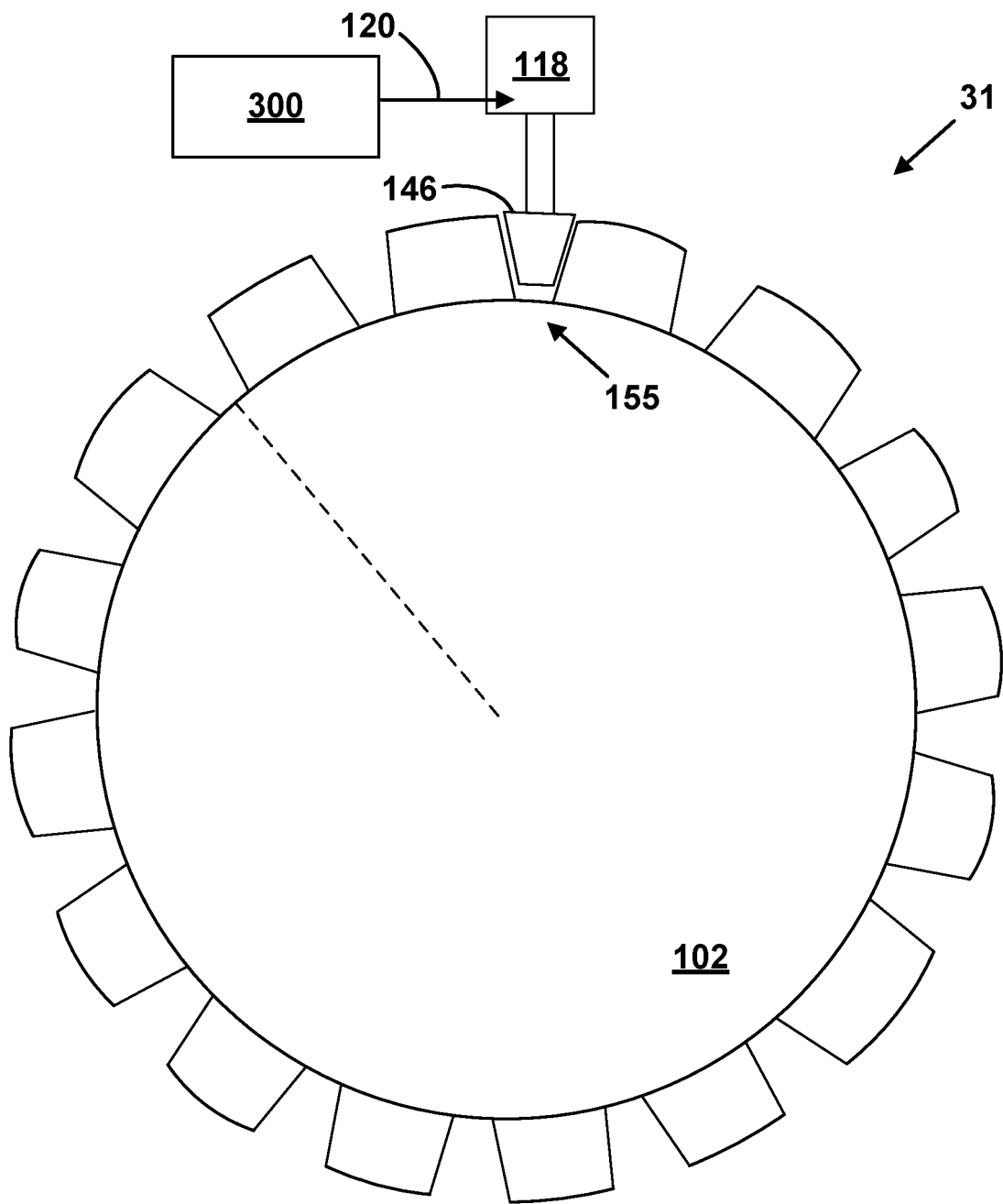
FIG. 15 is a schematic cross sectional diagram of a rotor and a lock, according to an example.

In FIG. 15, the computing system 300 is sending the second control signal 120 to the second lock 118, causing the second electromagnet of the second lock 118 to move the second pin 146 into the receptacle 155. This locks the rotor 102 in the second rotated position 31. In this example, the second lock 118 receives a second instance of the second control signal, which can therefore also be referred to as a third control signal.

Figure 16:
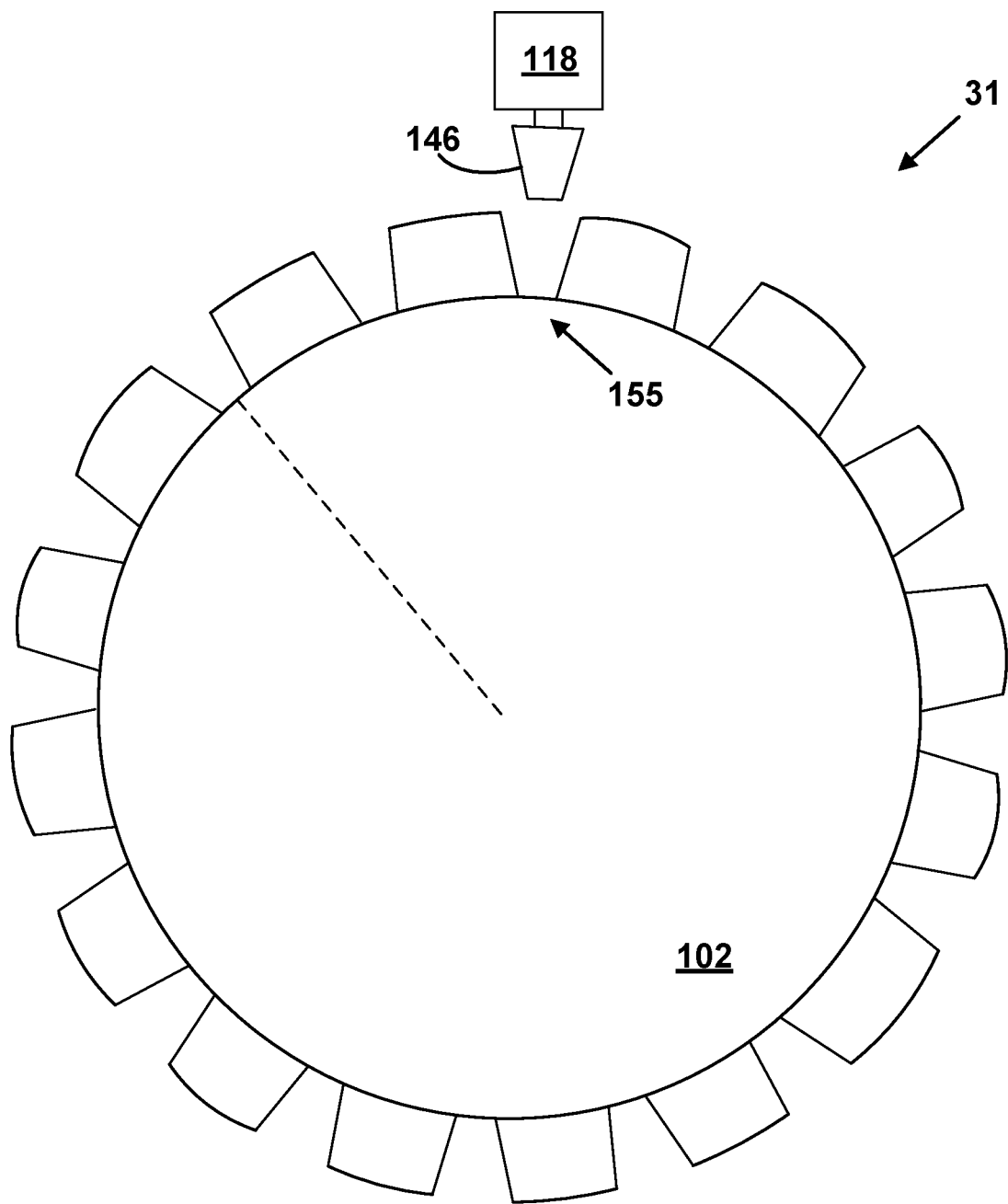
FIG. 16 is a schematic cross sectional diagram of a rotor and a lock, according to an example.

In FIG. 16, the second lock 118 is no longer receiving the second control signal from the computing system. Thus, the second spring of the second lock 118 removes the second pin 146 from the receptacle 155.

FIG. 17 shows the rotor 102 after the computing system 300 has rotated the rotor 102 to the home position 114. In the home position 114, the first lock 112 will prevent rotation of the rotor 102 as long as the first control signal 116 is not active (see FIG. 8).

FIGS. 18-19 show flowcharts of the method 200 and the method 250 for operating an actuator, according to example implementations. The method 200 and the method 250 present examples of methods that could be used with the computing system 300 and the actuator 100 shown in FIGS. 1-17. As shown in FIGS. 18-19, the method 200 and the method 250 include one or more operations, functions, or actions as illustrated by blocks 202, 204, 206, 208, 210, 212, 215, and 216. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Referring to FIG. 18, block 202 of the method 200 includes sending the first control signal 116 to the first lock 112, thereby causing the first lock 112 to disengage the rotor 102 and allow rotation of the rotor 102 with respect to a stator 106 that at least partially surrounds the rotor 102.

Block 204 of the method 200 includes sending the excitation currents 214 to the plurality of electromagnets 108 coupled to the stator 106 to apply magnetic force 110 to the permanent magnet(s) 104 of the rotor 102, thereby causing the rotor 102 to rotate from the home position 114 to the first rotated position 115.

Block 206 of the method 200 includes sending the second control signal 120 to the second lock 118, thereby causing the second lock 118 to engage the rotor 102 and prevent rotation of the rotor 102 from the first rotated position 115.

Block 208 of the method 200 includes deactivating the second control signal 120 to cause the second lock 118 to disengage the rotor 102 via mechanical bias of the second lock 118.

Block 210 of the method 200 includes rotating the rotor 102 from the first rotated position 115 to the home position 114.

Block 212 of the method 200 includes deactivating the first control signal 116 to cause the first lock 112 to engage the rotor 102 via mechanical bias of the first lock 112 and prevent rotation of the rotor 102 from the home position 114.

Referring to FIG. 19, block 215 of the method 250 includes detecting the position 21 of the second outboard section 23 of the second foldable wing 25 of the aircraft 10 with respect to the second inboard section 27 of the second foldable wing 25.

Block 216 of the method 250 includes using the plurality of electromagnets 108 to rotate the rotor 102 such that the current position 29 of the first outboard section 16 with respect to the first inboard section 14 is substantially equal to the position 21 of the second outboard section 23 with respect to the second inboard section 27.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Examples of the present disclosure can thus relate to one of the enumerated clauses (EC) listed below.

EC 1 is an actuator comprising: a rotor comprising a permanent magnet; a stator that at least partially surrounds the rotor; a plurality of electromagnets coupled to the stator that are configured to apply magnetic force to the permanent magnet to rotate the rotor; a first lock that (i) has a first mechanical bias to engage the rotor and prevent rotation of the rotor when the rotor is in a home position and (ii) is configured to disengage the rotor against the first mechanical bias while receiving a first control signal; and a second lock that (i) has a second mechanical bias to disengage the rotor and (ii) is configured to engage the rotor against the second mechanical bias to prevent rotation of the rotor while receiving a second control signal.

EC 2 is the actuator of EC 1, further comprising a return spring that is mechanically biased to rotate the rotor to the home position.

EC 3 is the actuator of any of ECs 1-2, wherein the rotor and the stator form a hinge having an axis of rotation, wherein the hinge is configured to mechanically couple a first object to a second object and allow rotation of the second object relative to the first object about the axis of rotation.

EC 4 is the actuator of EC 3, wherein the rotor comprises a plurality of permanent magnets, and wherein the plurality of electromagnets is configured to apply magnetic force to the plurality of permanent magnets to rotate the rotor.

EC 5 is the actuator of any of ECs 1-4, wherein the rotor comprises a receptacle and the first lock comprises a spring and a pin, wherein the spring is biased to push the pin into the receptacle when the receptacle is aligned with the pin, and wherein the receptacle is aligned with the pin when the rotor is in the home position.

EC 6 is the actuator of any of ECs 1-5, wherein the rotor comprises a receptacle and the first lock comprises a spring, a pin, and an electromagnet, and wherein the electromagnet is configured to move the pin against the spring to remove the pin from the receptacle while receiving the first control signal.

EC 7 is the actuator of any of ECs 1-6, wherein the rotor comprises a plurality of receptacles at respective positions on the rotor, wherein the second lock comprises a spring, a pin, and an electromagnet, and wherein the electromagnet is configured to move the pin against the spring to insert the pin into a receptacle of the plurality of receptacles that is aligned with the pin and prevent rotation of the rotor while receiving the second control signal.

EC 8 is the actuator of any of ECs 1-7, wherein the second lock comprises a spring and a pin, and wherein the spring is biased to push the pin away from the rotor to disengage the rotor.

EC 9 is an aircraft comprising: a foldable wing comprising an inboard section and an outboard section; and an actuator comprising: a rotor comprising a permanent magnet, wherein the rotor is mechanically coupled to the outboard section; a stator that at least partially surrounds the rotor, wherein the stator is mechanically coupled to the inboard section; a plurality of electromagnets coupled to the stator that are configured to apply magnetic force to the permanent magnet to rotate the outboard section; a first lock that (i) has a first mechanical bias to engage the rotor and prevent rotation of the outboard section when the outboard section is in a home position and (ii) is configured to disengage the rotor against the first mechanical bias while receiving a first control signal; and a second lock that (i) has a second mechanical bias to disengage the rotor and (ii) is configured to engage the rotor against the second mechanical bias to prevent rotation of the outboard section while receiving a second control signal.

EC 10 is the aircraft of EC 9, the actuator further comprising a return spring that is mechanically biased to rotate the outboard section to the home position.

EC 11 is the aircraft of any of ECs 9-10, wherein the rotor and the stator form a hinge having an axis of rotation, wherein the hinge mechanically couples the inboard section to the outboard section and allows rotation of the outboard section relative to the inboard section about the axis of rotation.

EC 12 is the aircraft of any of ECs 9-11, wherein the rotor comprises a receptacle and the first lock comprises a spring and a pin, wherein the spring is biased to push the pin into the receptacle when the receptacle is aligned with the pin, and wherein the receptacle is aligned with the pin when the outboard section is in the home position.

EC 13 is the aircraft of any of ECs 9-12, wherein the rotor comprises a receptacle and the first lock comprises a spring, a pin, and an electromagnet, and wherein the electromagnet is configured to move the pin against the spring to remove the pin from the receptacle while receiving the first control signal.

EC 14 is the aircraft of any of ECs 9-13, wherein the rotor comprises a plurality of receptacles at respective positions on the rotor, wherein the second lock comprises a spring, a pin, and an electromagnet, and wherein the electromagnet is configured to move the pin against the spring to insert the pin into a receptacle of the plurality of receptacles that is aligned with the pin and prevent rotation of the outboard section while receiving the second control signal.

EC 15 is the aircraft of any of ECs 9-14, wherein the second lock comprises a spring and a pin, and wherein the spring is biased to push the pin away from the rotor to disengage the rotor.

EC 16 is a method of operating an actuator, the method comprising: sending a first control signal to a first lock, thereby causing the first lock to disengage a rotor and allow rotation of the rotor with respect to a stator that at least partially surrounds the rotor; sending excitation currents to a plurality of electromagnets coupled to the stator to apply magnetic force to a permanent magnet of the rotor, thereby causing the rotor to rotate from a home position to a rotated position; sending a second control signal to a second lock, thereby causing the second lock to engage the rotor and prevent rotation of the rotor from the rotated position; deactivating the second control signal to cause the second lock to disengage the rotor via mechanical bias of the second lock; rotating the rotor from the rotated position to the home position; and deactivating the first control signal to cause the first lock to engage the rotor via mechanical bias of the first lock and prevent rotation of the rotor from the home position.

EC 17 is the method of EC 16, wherein rotating the rotor from the rotated position to the home position comprises sending additional excitation currents to the plurality of electromagnets to apply magnetic force to the permanent magnet, thereby causing the rotor to rotate from the rotated position to the home position.

EC 18 is the method of any of ECs 16-17, wherein rotating the rotor from the rotated position to the home position comprises rotating the rotor via mechanical bias of a return spring.

EC 19 is the method of any of ECs 16-18, wherein the rotor is mechanically coupled to a first outboard section of a first foldable aircraft wing of an aircraft, wherein the stator is mechanically coupled to a first inboard section of the first foldable aircraft wing, the method further comprising: detecting a position of a second outboard section of a second foldable aircraft wing of the aircraft with respect to a second inboard section of the second foldable aircraft wing; and using the plurality of electromagnets to rotate the rotor such that a current position of the first outboard section with respect to the first inboard section is substantially equal to the position of the second outboard section with respect to the second inboard section.

EC 20 is the method of any of ECs 16-19, wherein the rotated position is a first rotated position, and wherein rotating the rotor from the first rotated position to the home position comprises: rotating the rotor from the first rotated position to a second rotated position; sending a third control signal to the second lock, thereby causing the second lock to engage the rotor and prevent rotation of the rotor from the second rotated position; deactivating the third control signal to cause the second lock to disengage the rotor via mechanical bias of the second lock; and rotating the rotor from the second rotated position to the home position.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An actuator comprising:
   a rotor comprising a permanent magnet;
   a stator that at least partially surrounds the rotor;
   a plurality of electromagnets coupled to the stator that are configured to apply magnetic force to the permanent magnet to rotate the rotor;
   a first lock that (i) has a first mechanical bias configured to move the first lock into contact with the rotor, thereby preventing rotation of the rotor when the rotor is in a home position and (ii) is configured to move against the first mechanical bias to break contact with the rotor while receiving a first control signal; and
   a second lock that (i) has a second mechanical bias configured to move the second lock to break contact with the rotor and (ii) is configured to move to make contact with the rotor against the second mechanical bias to prevent rotation of the rotor while receiving a second control signal.

2. The actuator of claim 1, further comprising a return spring that is mechanically biased to rotate the rotor to the home position.

3. The actuator of claim 1, wherein the rotor and the stator form a hinge having an axis of rotation, wherein the hinge is configured to mechanically couple a first object to a second object and allow rotation of the second object relative to the first object about the axis of rotation.

4. The actuator of claim 3, wherein the rotor comprises a plurality of permanent magnets, and wherein the plurality of electromagnets is configured to apply magnetic force to the plurality of permanent magnets to rotate the rotor.

5. The actuator of claim 1, wherein the rotor comprises a receptacle and the first lock comprises a spring and a pin, wherein the spring is biased to push the pin into the receptacle when the receptacle is aligned with the pin, and wherein the receptacle is aligned with the pin when the rotor is in the home position.

6. The actuator of claim 1, wherein the rotor comprises a receptacle and the first lock comprises a spring, a pin, and an electromagnet, and wherein the electromagnet is configured to move the pin against the spring to remove the pin from the receptacle while receiving the first control signal.

7. The actuator of claim 1, wherein the rotor comprises a plurality of receptacles at respective positions on the rotor, wherein the second lock comprises a spring, a pin, and an electromagnet, and wherein the electromagnet is configured to move the pin against the spring to insert the pin into a receptacle of the plurality of receptacles that is aligned with the pin and prevent rotation of the rotor while receiving the second control signal.

8. The actuator of claim 1, wherein the second lock comprises a spring and a pin, and wherein the spring is biased to push the pin away from the rotor to disengage the rotor.

9. An aircraft comprising:
   a foldable wing comprising an inboard section and an outboard section; and
   an actuator comprising:
      a rotor comprising a permanent magnet, wherein the rotor is mechanically coupled to the outboard section;
      a stator that at least partially surrounds the rotor, wherein the stator is mechanically coupled to the inboard section;
      a plurality of electromagnets coupled to the stator that are configured to apply magnetic force to the permanent magnet to rotate the outboard section;
      a first lock that (i) has a first mechanical bias configured to move the first lock into contact with the rotor, thereby preventing rotation of the outboard section when the outboard section is in a home position and (ii) is configured to move against the first mechanical bias to break contact with the rotor while receiving a first control signal; and
      a second lock that (i) has a second mechanical bias configured to move the second lock to break contact with the rotor and (ii) is configured to move to make contact with the rotor against the second mechanical bias to prevent rotation of the outboard section while receiving a second control signal.

10. The aircraft of claim 9, the actuator further comprising a return spring that is mechanically biased to rotate the outboard section to the home position.

11. The aircraft of claim 9, wherein the rotor and the stator form a hinge having an axis of rotation, wherein the hinge mechanically couples the inboard section to the outboard section and allows rotation of the outboard section relative to the inboard section about the axis of rotation.

12. The aircraft of claim 9, wherein the rotor comprises a receptacle and the first lock comprises a spring and a pin, wherein the spring is biased to push the pin into the receptacle when the receptacle is aligned with the pin, and wherein the receptacle is aligned with the pin when the outboard section is in the home position.

13. The aircraft of claim 9, wherein the rotor comprises a receptacle and the first lock comprises a spring, a pin, and an electromagnet, and wherein the electromagnet is configured to move the pin against the spring to remove the pin from the receptacle while receiving the first control signal.

14. The aircraft of claim 9, wherein the rotor comprises a plurality of receptacles at respective positions on the rotor, wherein the second lock comprises a spring, a pin, and an electromagnet, and wherein the electromagnet is configured to move the pin against the spring to insert the pin into a receptacle of the plurality of receptacles that is aligned with the pin and prevent rotation of the outboard section while receiving the second control signal.

15. The aircraft of claim 9, wherein the second lock comprises a spring and a pin, and wherein the spring is biased to push the pin away from the rotor to disengage the rotor.

16. A method of operating an actuator, the method comprising:
   sending a first control signal to a first lock, thereby causing the first lock to break contact with a rotor and allow rotation of the rotor with respect to a stator that at least partially surrounds the rotor;
   sending excitation currents to a plurality of electromagnets coupled to the stator to apply magnetic force to a permanent magnet of the rotor, thereby causing the rotor to rotate from a home position to a rotated position;
   sending a second control signal to a second lock, thereby causing the second lock to make contact with the rotor and prevent rotation of the rotor from the rotated position;
   deactivating the second control signal to cause the second lock to break contact with the rotor via mechanical bias of the second lock;
   rotating the rotor from the rotated position to the home position; and
   deactivating the first control signal to cause the first lock to make contact with the rotor via mechanical bias of the first lock and prevent rotation of the rotor from the home position.

17. The method of claim 16, wherein rotating the rotor from the rotated position to the home position comprises sending additional excitation currents to the plurality of electromagnets to apply magnetic force to the permanent magnet, thereby causing the rotor to rotate from the rotated position to the home position.

18. The method of claim 16, wherein rotating the rotor from the rotated position to the home position comprises rotating the rotor via mechanical bias of a return spring.

19. The method of claim 16, wherein the rotor is mechanically coupled to a first outboard section of a first foldable aircraft wing of an aircraft, wherein the stator is mechanically coupled to a first inboard section of the first foldable aircraft wing, the method further comprising:
   detecting a position of a second outboard section of a second foldable aircraft wing of the aircraft with respect to a second inboard section of the second foldable aircraft wing; and
   using the plurality of electromagnets to rotate the rotor such that a current position of the first outboard section with respect to the first inboard section is substantially equal to the position of the second outboard section with respect to the second inboard section.

20. The method of claim 16, wherein the rotated position is a first rotated position, and wherein rotating the rotor from the first rotated position to the home position comprises:
   rotating the rotor from the first rotated position to a second rotated position;
   sending a third control signal to the second lock, thereby causing the second lock to engage the rotor and prevent rotation of the rotor from the second rotated position;
   deactivating the third control signal to cause the second lock to disengage the rotor via mechanical bias of the second lock; and
   rotating the rotor from the second rotated position to the home position.

* * * * *